United States Patent [19]
Brown

[11] 3,967,588
[45] *July 6, 1976

[54] ACCESSORY FOR A BIRD BATH

[76] Inventor: William E. Brown, 214 Park Ave., Pewaukee, Wis. 53072

[ * ] Notice: The portion of the term of this patent subsequent to July 6, 1991, has been disclaimed.

[22] Filed: Jan. 26, 1970

[21] Appl. No.: 5,767

[52] U.S. Cl. .................................... 119/26; 119/1
[51] Int. Cl.² ...................................... A01K 45/00
[58] Field of Search ............ 119/1, 26; D30/17, 18; 248/158

[56] References Cited
UNITED STATES PATENTS
| | | | |
|---|---|---|---|
| 1,575,101 | 3/1926 | Edwards | 119/26 |
| 3,648,659 | 3/1972 | Jones | 119/1 |

*Primary Examiner*—Aldrich F. Medbery
*Attorney, Agent, or Firm*—Andrus, Sceales, Starke & Sawall

[57] ABSTRACT

A perch structure for a bird bath is disclosed. The perch is disposed in spaced relation above and outwardly of the peripheral edge of the bath water containing vessel so as to generally parallel the peripheral edge of the vessel. The perch generally comprises an impediment in the flight-path of birds toward the bird bath and serves to encourage birds to alight thereon and drop excrement prior to entering the bath water. According to a further aspect of the disclosure, the means for securing the perch to the bird bath vessel includes a portion comprising a metal carbon electrocouple compound that extends into the bath water and serves to inhibit algae growth.

8 Claims, 4 Drawing Figures

INVENTOR
WILLIAM E. BROWN
BY Willis B. Swartwout
ATTORNEY

ACCESSORY FOR A BIRD BATH

SUMMARY AND BACKGROUND OF THE INVENTION

The present invention relates to an accessory for a bird bath and more particularly to an accessory for such device constructed to maintain the water therein contained relatively free of bird excrement and algae.

In the past bird baths have required frequent cleaning because the water became polluted from bird droppings and algae growth. Protracted observation discloses that excrement is deposited in a bird bath in two ways. First, the parent birds, when through feeding the young, clean out the nest by picking up the excrement deposited by the young in the nest in a mucus type sack. Which is then carried away when the parent bird picks the sack up in its beak and flies away from the nest. It is the nature of the parent bird to drop the sack the first time it perches. If such perching takes place at the edge of a bird bath, the excrement is dropped in the water contained therein since the bird will be facing the bath. Secondly, after a bird bathes and prepares to leave the bird bath it will move to the outer edge of the bath facing outwardly before taking off in flight. At this point immediately following bathing, a bird will frequently eliminate and the excrement naturally will drop in the water.

The excrement deposited in the water unfortunately is an excellent nutrient encouraging the growth of algae in the bath water. Some algae would normally be present and growing in the water in the bath in any event.

The protracted observation previously referred to discloses some further information valuable to an understanding of this application. When a bird is in flight enroute to a destination and a barrier is introduced in the flight path proximate the destination, the bird will alight on the barrier before proceeding to the ultimate destination. Additionally, when a bird is perched and anything touches its tail feathers, it will reverse its position and move to the impediment before taking off into flight. These two peculiarities should help to explain the function of the structure of the present invention.

The present invention proposes to overcome the problems previously referred to by providing a perch structure for attachment to a bird bath and which will surround the outer peripheral edge of the bird bath in spaced parallel relation or concentric thereto but in a horizontal plane elevated above the horizontal plane of the outer peripheral edge of the bird bath.

The present invention further proposes to overcome the hereinbefore discussed problems by providing structure previously referred to having portions extending into the water containing area of the bird bath, said portions being coated with a substance which will very slowly furnish copper ions to the water and retard the growth of the algae to a substantial extent.

It is therefore an object of the present invention to provide an accessory for bird baths including structure completely surrounding the outer peripheral edge of said bath in spaced parallel relation thereto and in a horizontal plane spaced above and parallel to the horizontal plane of said edge providing an impediment in the landing and take off path of a bird enroute to or from a bird bath.

It is a further object of the present invention to provide a device of the character described wherein further structure is provided which extends into the water contained in the bird bath said structure being coated with a substance, such as a copper carbon couple, which will slowly furnish a source of copper ions to the water to substantially retard algae growth.

It is still another object of the present invention to provide a device of the character described wherein the structure surrounding the outer peripheral edge of the bird bath, as previously described, is in a horizontal plane so spaced vertically above the horizontal plane of said edge that it would contact the tail feathers of a bird perched on the edge and facing inwardly toward the center of the bath when the bird is in level or balanced stance, thereby causing the bird to face about and move to the surrounding structure.

Further objects and advantages of the present invention will become apparent as this description proceeds, as will various modifications and changes which can be made to the structure of the device without departing from the spirit of the present invention. Such additional objects, advantages, modifications and changes are intended to be covered by the scope of the appended claims.

DESCRIPTION OF THE DRAWING FIGURES

DESCRIPTION OF THE ILLUSTRATED EMBODIMENT

Figure 1:
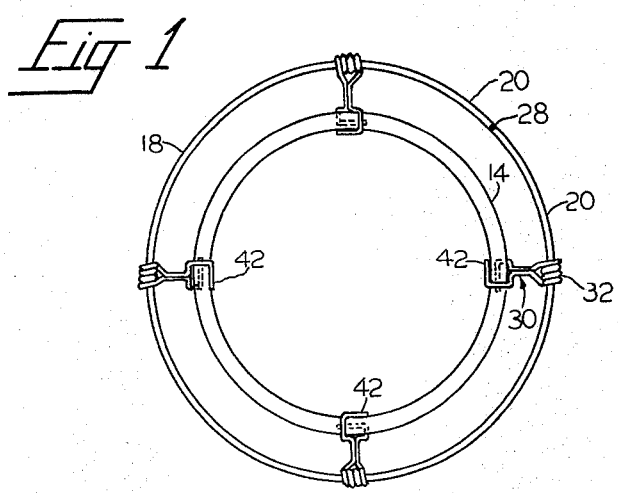
FIG. 1 is a top plan view of structure embodying the present invention.
Figure 2:
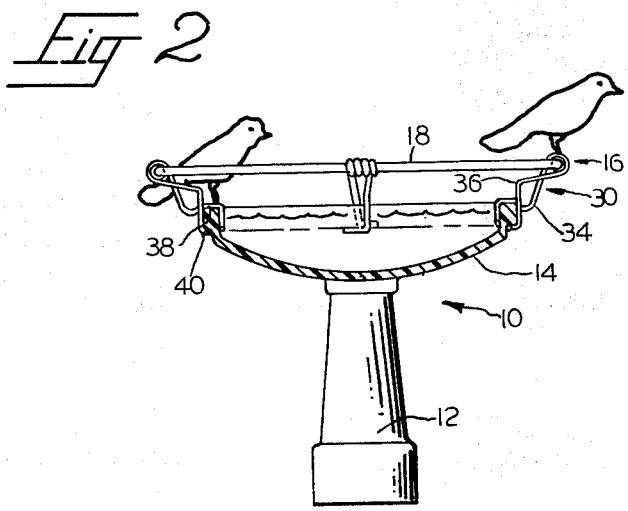
FIG. 2 is a side elevation of the structure shown in FIG. 1 with parts broken away and sectioned to better show the invention.
Figure 3:
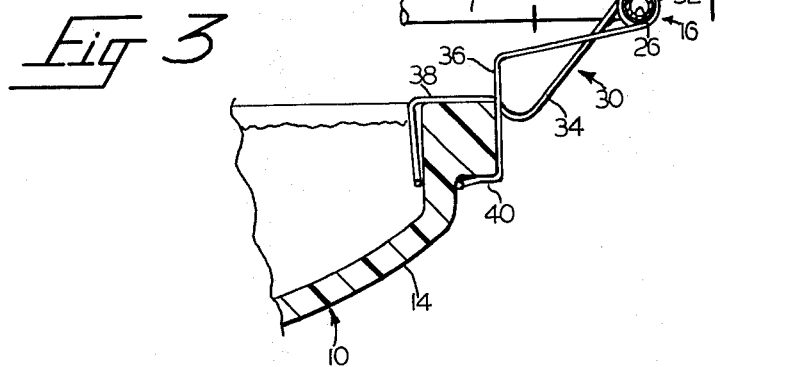
FIG. 3 is an enlarged detail section through a portion of structure embodying the present invention.

Referring now to the drawings, and more particularly to FIGS. 1 and 2 thereof, a bird bath is shown generally indicated by the numeral 10. Bath 10 includes a base 12 and a vessel 14. Connected to vessel 14 is an accessory device in accordance with this invention generally indicated by the numeral 16.

Device 16 is shown as being generally circular in shape or concentric relative to the vessel 14, but it should be noted that the device is designed to be shaped in accordance with the shape of the vessel to which it will be attached in order to perform its function properly in accordance with the teaching herein contained. Therefore, device 16 may be shaped to any desired configuration to correspond to shape of the vessel and circular has been chosen simply because most such vessels are circular.

Figure 4:
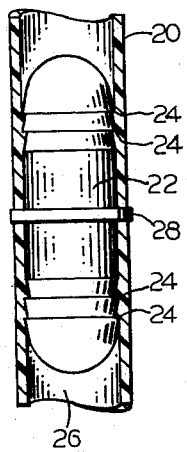
FIG. 4 is an enlarged section showing the joining or coupling means for connecting the adjacent ends of the tubing sections.

Device 16 consists of a perch 18 made from one or more tubing sections 20. In the preferred embodiment described perch 18 is made up of one section 20, cylindrical in cross-section, made from a pliable material such as plastic. Section 20 may be formed into a circle with opposite ends in adjacent relationships as indicated in FIG. 4 of the drawings. An elongated joining member 22 is provided having a plurality of annular flanges 24 extending at an angle relative to the longitudinal axis of member 22 an equal number of flanges 24 being disposed adjacent to opposite ends of member 22 such that the angle lines of flanges oppositely disposed would intersect. Flanges 24 are slightly greater in cross-sectional dimension than member 22 and than the aperature defined by inner wall 26 of section 20. Member 22 is further provided with a centrally disposed abutment 28 which is at least as great in cross-sectional dimension as the outer peripheral cross-section dimension of section 20.

A plurality of clamping members 30 are provided which in the preferred embodiment are shown to be of single unit construction. Clamping members 30 include a centrally wound cylindrical spring section 32 scissor legs 34 and 36 extending from respective opposite cylinder defining end windings in a tangential direction. Legs 34 and 36 are formed to extend toward each other or converge as they extend tangential away from section 32 so as to be disposed in adjacent vertical planes perpendicular to the longitudinal centerline axis of section 32. The respective legs 34 and 36 extend in respective planes tangential to section 32 so as to converge, intersect and then diverge relative to each other. At the extremities of the tangential extension of legs 34 and 36 furthest remote from section 32 the respective legs are formed to converge again such that they will ultimately lie in generally horizontal planes in the normal relaxed position. It may now be seen that as the extremities of tangential extension of legs 34 and 36 furthest remote from central spring section 32 and manually biased toward each other the feet 38 and 40 will move into increasingly spaced generally horizontal planes permitting the insertion therebetween of an object and placing section 32 under tension. As manual biasing of said extremities is released feet 38 and 40 will move toward their respective original positions clamping any object therebetween under the biasing tension in spring section 32.

The cylindrical aperture defined by spring section 32 of clamping member 30 is sufficiently large in cross-sectional dimension to receive therethrough longitudinally the tubing section 20 of perch 18. In assembly, the tubing section 20 is longitudinally inserted through a plurality of clamping members 30 as described and respective opposite ends of section 20 are joined by being forced over a joining member 22 in an approaching longitudinal axial direction until the respective opposite ends of section 20 abut abutment 28 on opposite sides thereof and the flanges 24 will frictionally grip inner wall 26 of section 20 holding tubing section in the desired form. Clamping members 30 may then be operated to couple perch structure to another selected object, like the periphery of the bird bath 10.

It should be obvious to those skilled in the art that in the event it is desired to attach a device of the character described to a vessel 14 having a geometric configuration other than circular, a plurality of sections 20 may be formed to suit the requirements and joined by a plurality of members 22 and attached as taught herein in circumscribing spaced parallel vertical plane relationships to such vessel in a horizontal plane spaced above the horizontal plane of the outer peripherial edge of the vessel.

There is further disclosed in FIG. 1, of the drawings a clamping member 30 having a foot 38 with an extension 42 extending therefrom such as to be in immersed relation to the contents of the vessel 14. Extension 42 may be coated with a compound containing a copper carbon couple which will react when immersed in water to slowly furnish copper ions to water thereby impeding the growth of algae therein.

I claim:

1. In combination; a vessel, a perch, said perch being of substantially the same geometric configuration in horizontal plan as the peripheral edge of the vessel and defining an area greater than the area defined by said edge and legs for connecting said perch to said vessel in spaced circumscribing relationship to said vessel edge in a horizontal plane parallel to and spaced above the horizontal plane of said vessel edge.

2. The combination as set forth in claim 1 wherein said perch includes a plurality of elongated tubular sections coupled by joining members inserted within the ends of adjacent sections, said joining members having flanges frictionally engaging the inner surface of said tubular sections to hold said sections in joined relation.

3. The combination as set forth in claim 1, wherein said perch comprises an elongated pliable tubular section, the respective ends of said tubular section being connected by a joining member having flanges for frictionally engaging the inner surface of said section to hold said ends in joined relation.

4. The combination as set forth in claim 1, wherein at least one of said legs includes a foot section which extends into said vessel when said perch is connected thereto, said foot being coated with a metal carbon electrocouple compound.

5. An accessory for a vessel comprising a perch, said perch being of substantially the same geometric configuration in horizontal plan as the peripheral edge of the vessel and defining an area greater than the area defined by the edge of said vessel, and means for connecting and supporting said perch in spaced circumscribing relationship to said vessel edge in a horizontal plane parallel to and spaced above the horizontal plane of the edge of said vessel.

6. An accessory for a bird bath having a water containing vessel, comprising a perch, said perch having an annular configuration corresponding generally to the peripheral edge of the bird bath vessel and being disposed in spaced relation above and outwardly from said peripheral edge to generally parallel said edge, and means securing the perch to the bird bath.

7. The structure as set forth in claim 6 wherein the means securing the perch to the bird bath comprise clamp means extending from the perch to engage with the bird bath vessel.

8. The structure as set forth in claim 7 wherein the clamping means include a portion comprising a metal carbon electrocouple compound adapted to extend into the bath water and serving to inhibit algae growth.

* * * * *

UNITED STATES PATENT AND TRADEMARK OFFICE
CERTIFICATE OF CORRECTION

PATENT NO. : 3,967,588
DATED : July 6, 1976
INVENTOR(S) : William E. Brown

It is certified that error appears in the above-identified patent and that said Letters Patent are hereby corrected as shown below:

Title Page, Item 56, Add the following references:

1,803,413   5/1931   Trites      119/1
        3,084,666   4/1963   Plaisance  119/1

Column 3, line 46, After "holding" insert ---the---

Column 3, line 48, After "couple" insert ---the---

Signed and Sealed this

Seventh Day of December 1976

[SEAL]

Attest:

RUTH C. MASON
*Attesting Officer*

C. MARSHALL DANN
*Commissioner of Patents and Trademarks*